(12) United States Patent
Wentink et al.

(10) Patent No.: US 9,172,455 B2
(45) Date of Patent: Oct. 27, 2015

(54) START FRAME FOR DISTRIBUTED MIMO

(75) Inventors: Maarten Menzo Wentink, Utrecht (NL); Richard Van Nee, De Meern (NL); Albert Van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 12/703,927

(22) Filed: Feb. 11, 2010

(65) Prior Publication Data

US 2010/0208781 A1     Aug. 19, 2010

Related U.S. Application Data

(60) Provisional application No. 61/152,557, filed on Feb. 13, 2009.

(51) Int. Cl.
*H04B 7/02*     (2006.01)
*H04B 7/06*     (2006.01)
*H04B 7/04*     (2006.01)

(52) U.S. Cl.
CPC ............ *H04B 7/0697* (2013.01); *H04B 7/0617* (2013.01); *H04B 7/0452* (2013.01)

(58) Field of Classification Search
CPC .......... H04B 7/02; H04B 7/04; H04B 7/0404; H04B 7/0413; H04B 7/0426; H04B 7/0452; H04B 7/08
USPC .................................. 375/267, 219, 295, 316
See application file for complete search history.

(56) References Cited

U.S. PATENT DOCUMENTS 7,352,718 B1*   4/2008   Perahia et al. ................ 370/329
7,804,800 B2*   9/2010   Li et al. ......................... 370/334
(Continued)

FOREIGN PATENT DOCUMENTS

JP     2006197207 A     7/2006
JP     2007208522 A     8/2007
(Continued)

OTHER PUBLICATIONS

IEEE P802.11 Wireless Lans: "TGn Sync Proposal Technical Specification", IEEE 802.11-04/0889R5, May 13, 2005, pp. 1-90, XP002610830, U.S.A Retrieved from the Internet: URL:https://mentor.ieee.org/802.11/documents [retrieved on Nov. 9, 2010] .
(Continued)

*Primary Examiner* — Siu Lee
(74) *Attorney, Agent, or Firm* — Eric Ho

(57) ABSTRACT

Embodiments of the present disclosure generally relate to communication, and more specifically to distributed multiple-input multiple-output (MIMO) systems. For certain aspects, methods and apparatus are provided for transmitting a start frame containing information regarding parallel MIMO transmissions in a transmit opportunity and transmitting one or more parallel MIMO streams in accordance with the information contained in the start frame. For certain aspects, methods and apparatus are provided for receiving a start frame containing information regarding parallel MIMO transmissions in a transmit opportunity and transmitting one or more parallel MIMO streams in accordance with the information contained in the start frame. For certain aspects, methods and apparatus are provided for receiving a start frame containing information regarding parallel MIMO transmissions in a transmit opportunity and receiving one or more parallel MIMO streams in accordance with the information contained in the start frame.

45 Claims, 13 Drawing Sheets

(56) References Cited

U.S. PATENT DOCUMENTS

| | | | |
|---|---|---|---|
| 8,320,301 | B2 | 11/2012 | Walton et al. |
| 8,483,105 | B2 * | 7/2013 | Nanda et al. ............ 370/278 |
| 2002/0126789 | A1 | 9/2002 | Georges et al. |
| 2003/0185241 | A1 | 10/2003 | Lu et al. |
| 2005/0135284 | A1 | 6/2005 | Nanda et al. |
| 2005/0135318 | A1 * | 6/2005 | Walton et al. ............ 370/338 |
| 2005/0141540 | A1 * | 6/2005 | Li et al. ............ 370/437 |
| 2005/0219999 | A1 * | 10/2005 | Kim et al. ............ 370/207 |
| 2005/0259686 | A1 * | 11/2005 | Lewis ............ 370/469 |
| 2005/0270975 | A1 | 12/2005 | Meylan et al. |
| 2006/0126752 | A1 * | 6/2006 | Hansen et al. ............ 375/267 |
| 2006/0153098 | A1 | 7/2006 | Shimizu et al. |
| 2006/0264218 | A1 * | 11/2006 | Zhang et al. ............ 455/450 |
| 2007/0058605 | A1 * | 3/2007 | Meylan et al. ............ 370/346 |
| 2007/0230373 | A1 | 10/2007 | Li et al. |
| 2007/0286303 | A1 * | 12/2007 | Yamaura ............ 375/267 |
| 2008/0075033 | A1 * | 3/2008 | Shattil ............ 370/328 |
| 2009/0196364 | A1 * | 8/2009 | Nakajima et al. ............ 375/260 |
| 2010/0046495 | A1 * | 2/2010 | Wolf et al. ............ 370/344 |
| 2010/0135177 | A1 * | 6/2010 | Liu et al. ............ 370/252 |

FOREIGN PATENT DOCUMENTS

| | | |
|---|---|---|
| JP | 2007318727 A | 12/2007 |
| JP | 2008172356 A | 7/2008 |
| JP | 2008535380 A | 8/2008 |
| TW | I274482 | 2/2007 |
| WO | WO-2004039011 A2 | 5/2004 |
| WO | 2004095730 A1 | 11/2004 |
| WO | 2006107538 A2 | 10/2006 |
| WO | WO2007114804 A1 | 10/2007 |
| WO | WO2007117949 | * 10/2007 |
| WO | WO 2007117949 | * 10/2007 |
| WO | WO2009012446 | 1/2009 |

OTHER PUBLICATIONS

International Search Report and Written Opinion—PCT/US2010/024097, International Search Authority—European Patent Office—Dec. 7, 2010.

Milan Knize et al., "Achievable Rate Region of Multiple Access with Linearly Precoded Parallel Block-Fading MIMO Channels", 2nd International Symposium on Wireless Communication Systems, 2005, pp. 3-7.

IEEE P802.11n/D2.00, "Draft Standard for Information Technology—Telecommunications and information exchange between systems—Local and metropolitan area networks—Specific requirements", Part 11, Feb. 2007, pp. 114-119, 130-142, 148-158.

Motorola et al.,PUCCH Reporting,3GPP R1-083211,Aug. 22, 2008.

Nortel Networks,Opportunistic Space Time Multiple Access for LTE-Advanced,3GPP R1-090159,Jan. 16, 2009.

Osawa R et al., "Study of Two-way Channel Estimation Technique for Multi-user Distributed Antenna Systems with Spatial Precoding," Technical Report of the Institute of Electronics, Information and Communication Engineers, Feb. 25, 2009, vol. 108, No. 445, pp. 71-76, RCS2008-224.

Taiwan Search Report—TW099104890—TIPO—Feb. 19, 2013.

Adachi F., et al., "Study on MIMO channel Capacity in a Frequency-Selective Channel," Proceedings of the 2008 IEICE General Conference, Mar. 5, 2008, Communication 1, pp. S-7, 8, BS-1-4.

Mizutani K., et al., "Performance Comparison between Feedback and Feedback-less Method to obtain CSIT in Multi-user MIMO Precoding", Technical Report of The Institute of Electronics, Information and Communication Engineers, Feb. 27, 2008, vol. 107, No. 518, pp. 335-340, RCS 2007-242.

* cited by examiner

The AP and STA1 transmit to STA5-STA8 in parallel

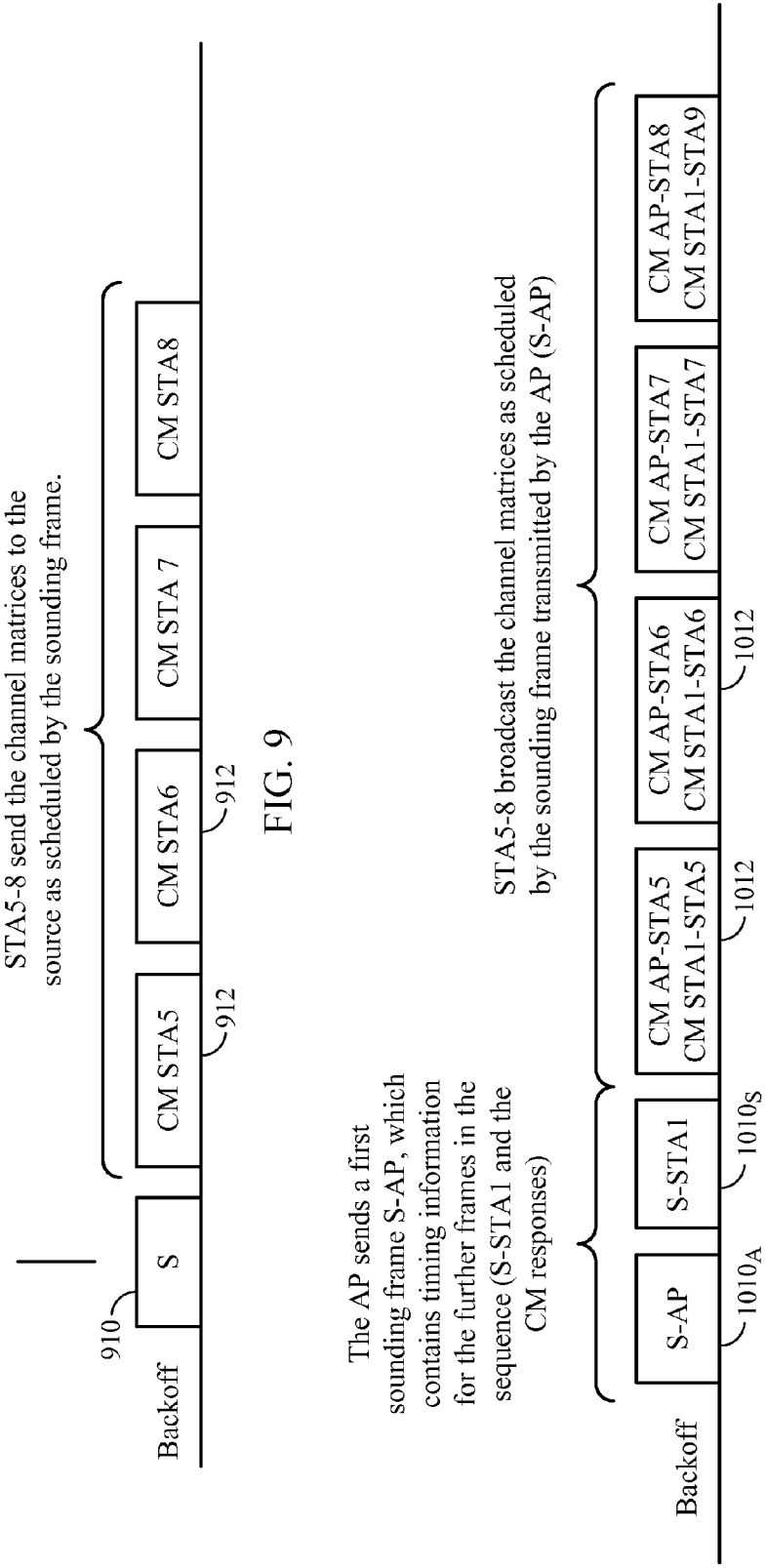

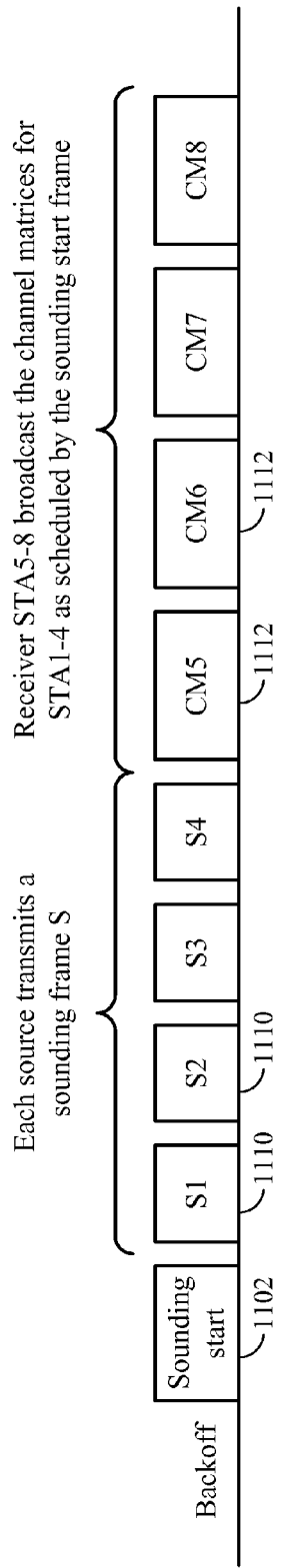
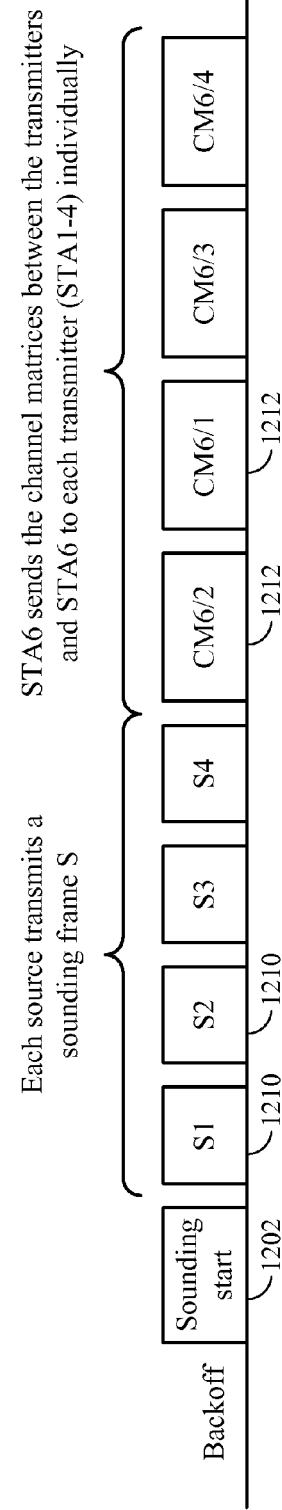
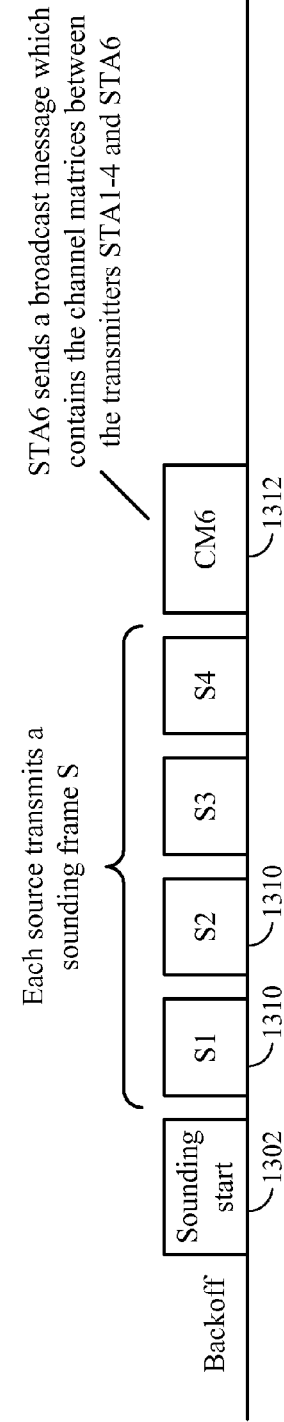

START FRAME FOR DISTRIBUTED MIMO

CLAIM OF PRIORITY UNDER 35 U.S.C. §119

The present Application for patent claims benefit of U.S. Provisional Patent Application No. 61/152,557, entitled, "DISTRIBUTED MIMO," filed Feb. 13, 2009 assigned to the assignee hereof and hereby expressly incorporated by reference herein.

TECHNICAL FIELD

The present disclosure generally relates to communication, and more specifically to distributed multiple-input multiple-output (MIMO) systems.

BACKGROUND

Some wireless technologies, such as Spatial Division Multiple Access (SDMA), allow for multiple transmissions to occur in parallel without causing a collision. A potential application of such technologies is the distribution of multiple video streams in parallel. For example, a video stream may be 2 Mbps for Standard Definition Television (SDTV) using Moving Picture Expert Group 1 (MPEG1), 8 to 25 Mbps for High Definition Television (HDTV) using MPEG2, and up to 54 Mbps for Blu-ray.

In certain applications, video streams may be transmitted using Multiple-input-multiple-output (MIMO) techniques. MIMO generally refers to simultaneous transmissions from multiple transmit antennas to multiple receive antennas.

SUMMARY

Certain embodiments provide a method for wireless communications. The method generally includes transmitting a start frame containing information regarding parallel multiple-input multiple-output (MIMO) transmissions in a transmit opportunity and transmitting one or more parallel MIMO streams in accordance with the information contained in the start frame.

Certain embodiments provide a method for wireless communications a method for wireless communications. The method generally includes receiving a start frame containing information regarding parallel multiple-input multiple-output (MIMO) transmissions in a transmit opportunity and transmitting one or more parallel MIMO streams in accordance with the information contained in the start frame.

Certain embodiments provide a method for wireless communications. The method generally includes receiving a start frame containing information regarding parallel multiple-input multiple-output (MIMO) transmissions in a transmit opportunity and receiving one or more parallel MIMO streams in accordance with the information contained in the start frame.

Certain embodiments provide an apparatus for wireless communications. The apparatus generally includes logic for transmitting a start frame containing information regarding parallel multiple-input multiple-output (MIMO) transmissions in a transmit opportunity and logic for transmitting one or more parallel MIMO streams in accordance with the information contained in the start frame.

Certain embodiments provide an apparatus for wireless communications. The apparatus generally includes logic for receiving a start frame containing information regarding parallel multiple-input multiple-output (MIMO) transmissions in a transmit opportunity and logic for transmitting one or more parallel MIMO streams in accordance with the information contained in the start frame.

Certain embodiments provide an apparatus for wireless communications. The apparatus generally includes logic for receiving a start frame containing information regarding parallel multiple-input multiple-output (MIMO) transmissions in a transmit opportunity and logic for receiving one or more parallel MIMO streams in accordance with the information contained in the start frame.

Certain embodiments provide an apparatus for wireless communications. The apparatus generally includes means for transmitting a start frame containing information regarding parallel multiple-input multiple-output (MIMO) transmissions in a transmit opportunity and means for transmitting one or more parallel MIMO streams in accordance with the information contained in the start frame.

Certain embodiments provide an apparatus for wireless communications. The apparatus generally includes means for receiving a start frame containing information regarding parallel multiple-input multiple-output (MIMO) transmissions in a transmit opportunity and means for transmitting one or more parallel MIMO streams in accordance with the information contained in the start frame.

Certain embodiments provide an apparatus for wireless communications. The apparatus generally includes means for receiving a start frame containing information regarding parallel multiple-input multiple-output (MIMO) transmissions in a transmit opportunity and means for receiving one or more parallel MIMO streams in accordance with the information contained in the start frame.

Certain embodiments provide a computer-program product for wireless communications comprising a computer readable medium having a set of instructions stored thereon, the set of instructions being executable by one or more processors. The set of instructions generally includes instructions for transmitting a start frame containing information regarding parallel multiple-input multiple-output (MIMO) transmissions in a transmit opportunity and instructions for transmitting one or more parallel MIMO streams in accordance with the information contained in the start frame.

Certain embodiments provide a computer-program product for wireless communications comprising a computer readable medium having a set of instructions stored thereon, the set of instructions being executable by one or more processors. The set of instructions generally includes instructions for receiving a start frame containing information regarding parallel multiple-input multiple-output (MIMO) transmissions in a transmit opportunity and instructions for transmitting one or more parallel MIMO streams in accordance with the information contained in the start frame.

Certain embodiments provide a computer-program product for wireless communications comprising a computer readable medium having a set of instructions stored thereon, the set of instructions being executable by one or more processors. The set of instructions generally includes instructions for receiving a start frame containing information regarding parallel multiple-input multiple-output (MIMO) transmissions in a transmit opportunity and instructions for receiving one or more parallel MIMO streams in accordance with the information contained in the start frame.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 9-13 illustrate example sounding techniques, in accordance with certain embodiments of the present disclosure.

DETAILED DESCRIPTION

Certain embodiments of the present disclosure provide techniques and apparatus that may be utilized in distributed MIMO systems.

An Example Wireless Communication System

The word "exemplary" is used herein to mean "serving as an example, instance, or illustration." Any embodiment described herein as "exemplary" is not necessarily to be construed as preferred or advantageous over other embodiments.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Figure 1:
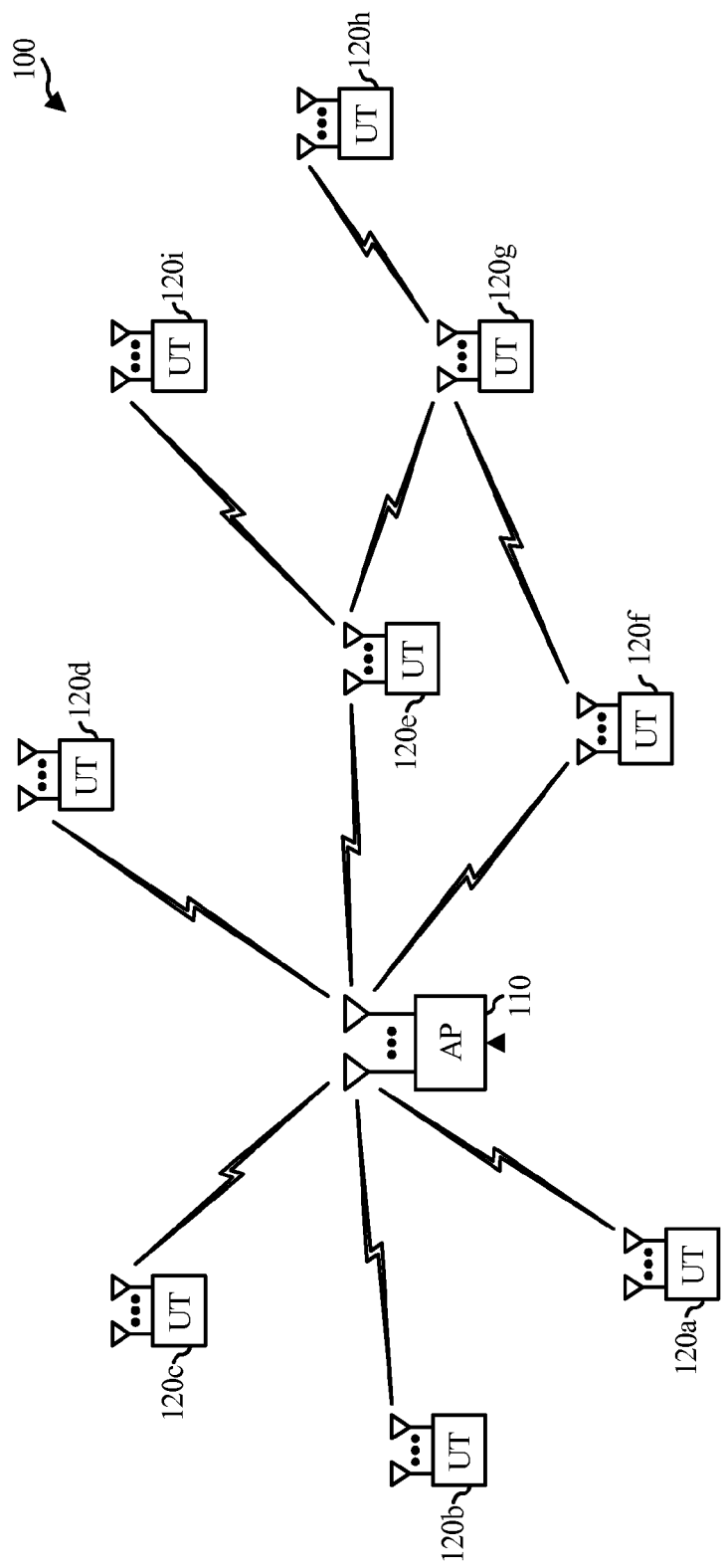
FIG. 1 illustrates a spatial division multiple access MIMO wireless system in accordance with certain embodiments of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. The access point may also be a mobile station, in which case it may be referred to as a group owner. A user terminal may be fixed or mobile and may also be referred to as a mobile station, a wireless device, a client, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point.

A user terminal may also communicate peer-to-peer with another user terminal For example, in the illustrated example, UTs 120e, 120f, 120g, 120h, and 120i are shown with peer-to-peer links. These UTs may also have a link with the AP in addition to the illustrated peer-to-peer link with a UT.

While portions of the following disclosure will describe user terminals 120 capable of communicating via SDMA, for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
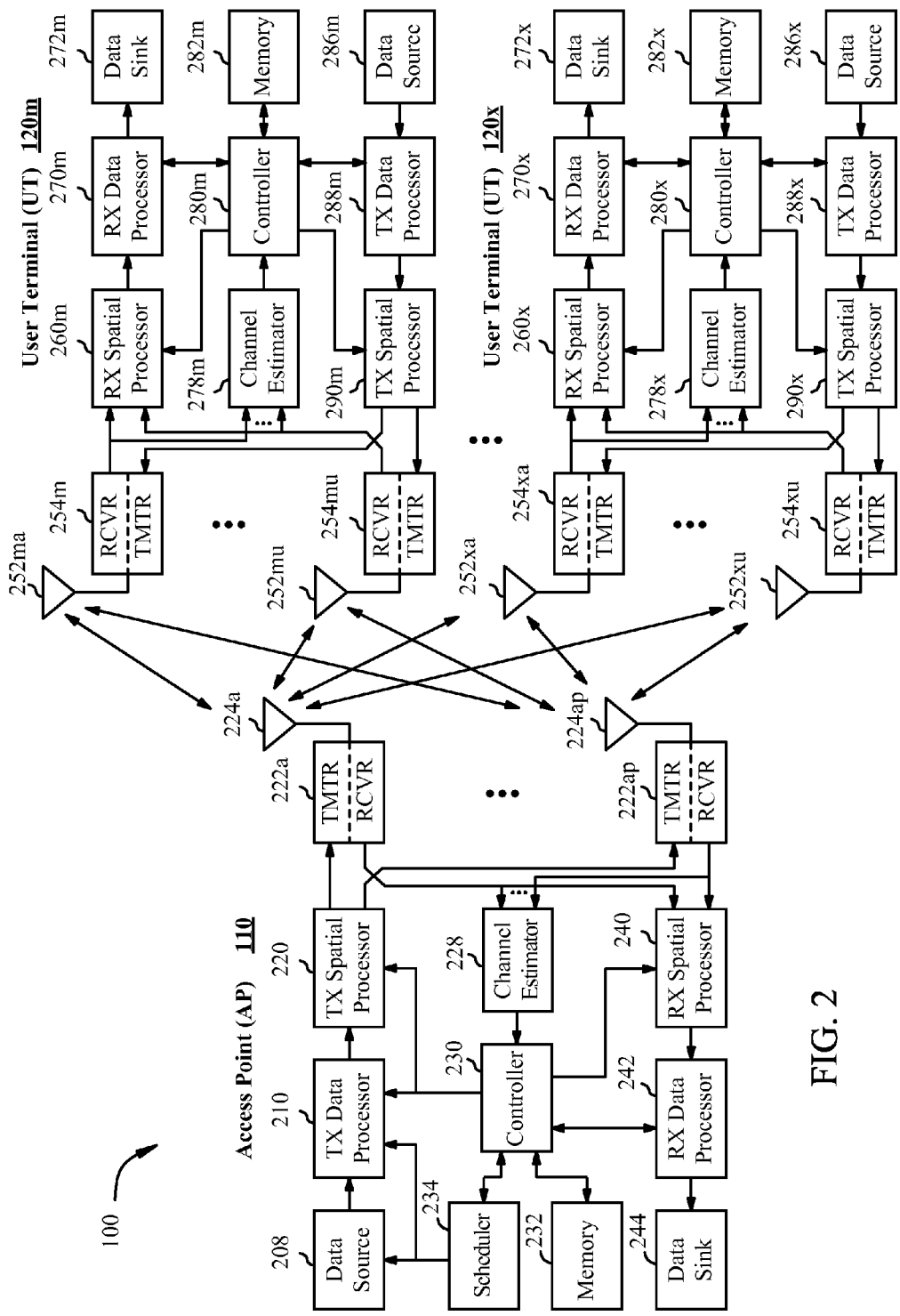
FIG. 2 illustrates a block diagram of an access point and two user terminals in accordance with certain embodiments of the present disclosure.

FIG. 2 shows a block diagram of access point 110 and two user terminals 120m and 120x in MIMO system 100. Access point 110 is equipped with antennas 224a through 224t. User terminal 120m is equipped with antennas 252ma through 252mu, and user terminal 120x is equipped with antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides transmit symbol streams for the antennas. Each transmitter unit (TMTR) 254 receives and processes (e.g., converts to analog, amplifies, filters, and frequency upconverts) a respective transmit symbol stream to generate an uplink signal. transmitter units 254 provide uplink signals for transmission from antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the received symbol streams from receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides transmit symbol streams for the antennas. Each transmitter unit 222 receives and processes a respective transmit symbol stream to generate a downlink signal. transmitter units 222 providing downlink signals for transmission from antennas 224 to the user terminals.

At each user terminal 120, antennas 252 receive the downlink signals from access point 110. Each receiver unit 254 processes a received signal from an associated antenna 252 and provides a received symbol stream. An RX spatial processor 260 performs receiver spatial processing on received symbol streams from receiver units 254 and provides a recovered downlink data symbol stream for the user terminal The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$ Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
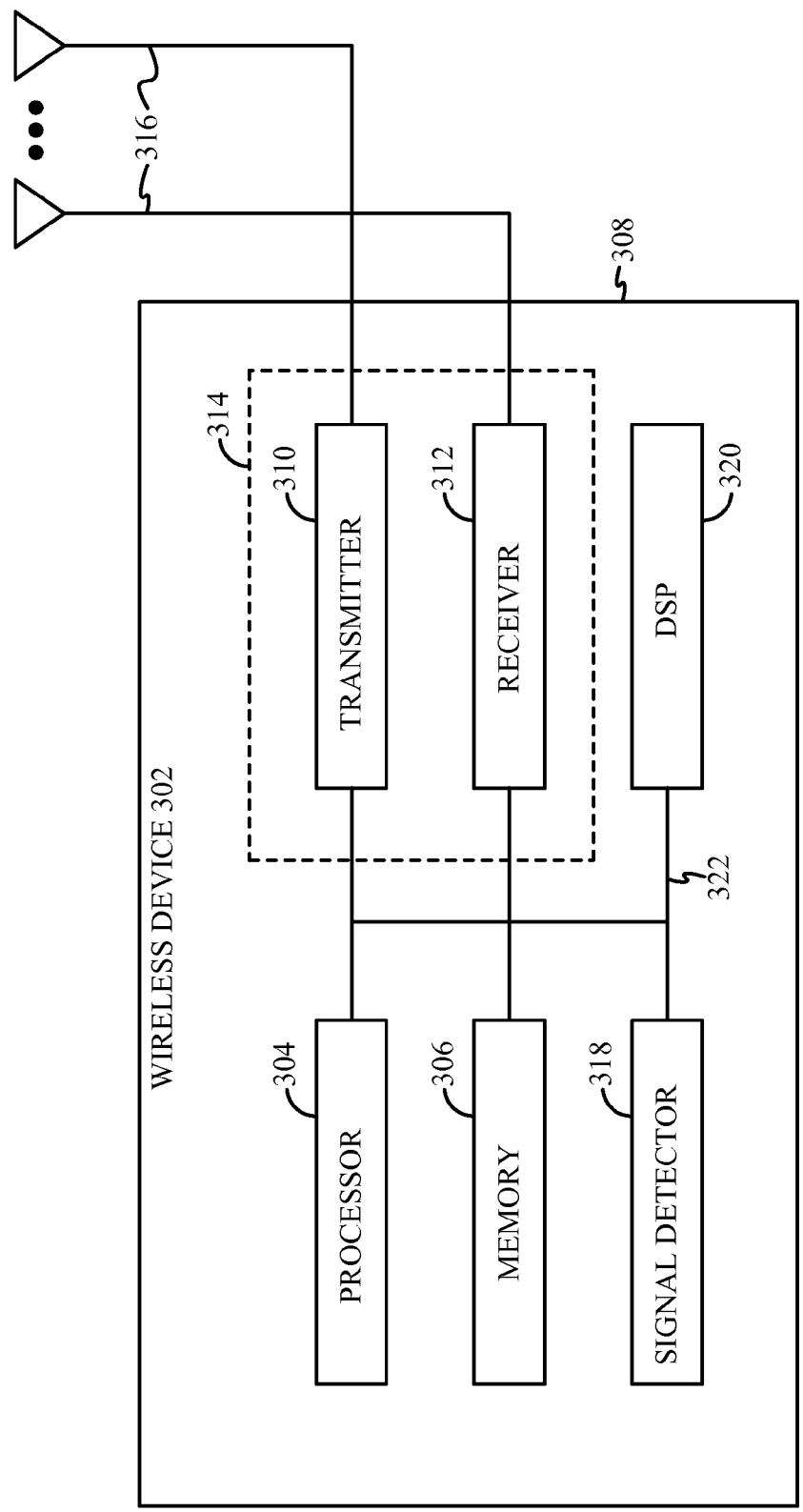
FIG. 3 illustrates various components that may be utilized in a wireless device in accordance with certain embodiments of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The wireless system shown in FIGS. 1-3 may refer to the SDMA system where antennas at the access point are located in sufficiently different directions, which insures no interference between simultaneously transmitted spatial streams dedicated to different user terminals. For certain embodiments of the present disclosure, the wireless system shown in FIGS. 1-3 may refer to the multiuser system where a precoding (beamforming) of the transmission signal is applied providing orthogonality between spatial streams dedicated to different user terminals, while the access point antennas do not necessarily need to be located in sufficiently different directions.

Distributed MIMO

Certain embodiments of the present disclosure provide techniques and apparatus that may be utilized in distributed MIMO systems. As described above, MIMO generally refers to simultaneous transmissions from multiple transmit antennas to multiple receive antennas. The IEEE 802.11n standard, for example, specifies MIMO transmissions where the multiple transmit antennas belong to one user. MIMO may be used in a wide variety of wireless applications.

Figure 4:
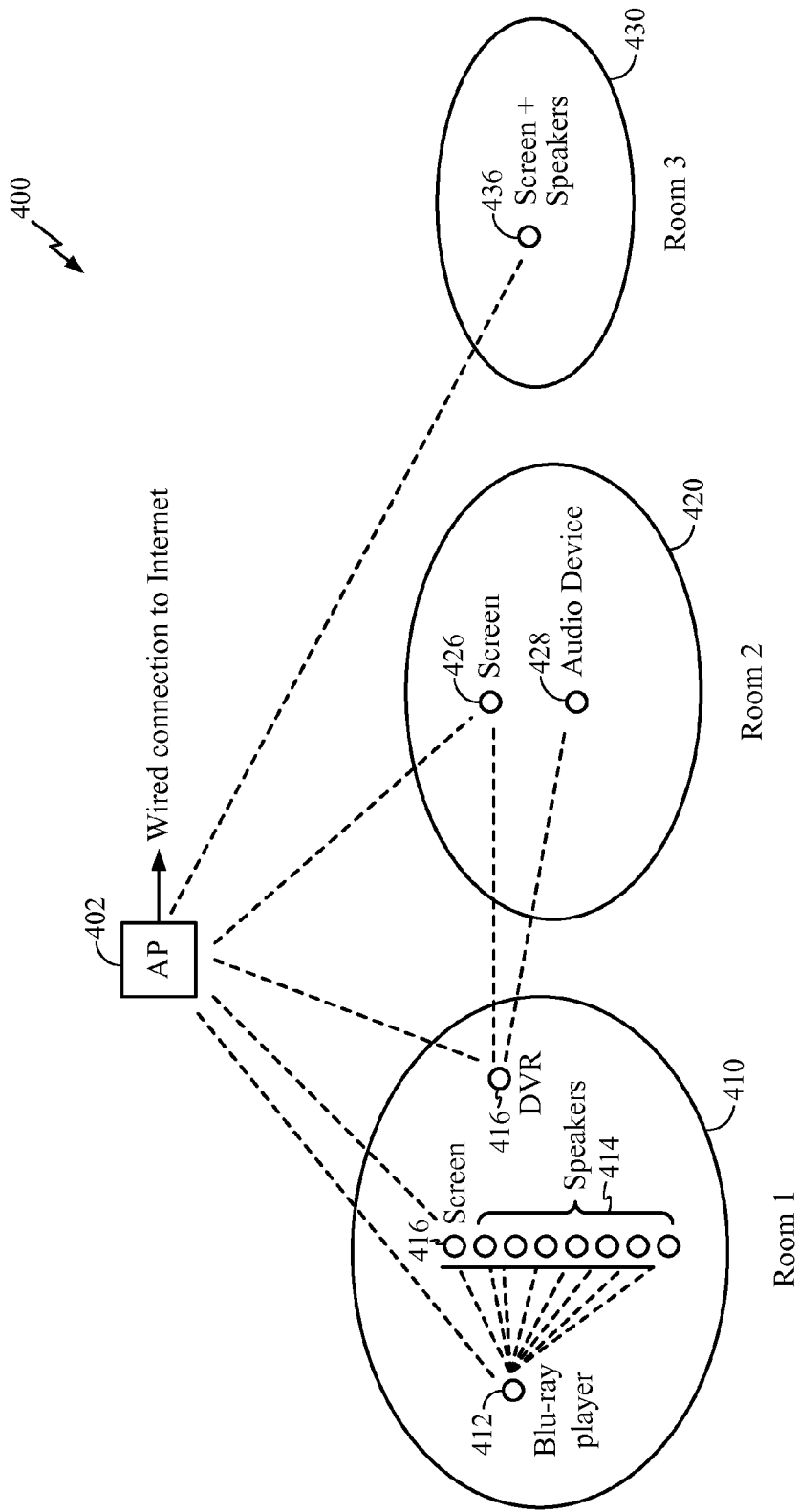
FIG. 4 illustrates an example environment in which embodiments of the present disclosure may be utilized.

For example, in a home environment, audio-video (AV) traffic may be exchanged between several sources and destinations. As illustrated in FIG. 4, an access point (AP) 402, illustratively shown with a wired connection to the Internet, may stream media to various devices, such as a Blu-ray player 412, monitor (screen) 416, and digital video recorder (DVR) 418 in a first room 410, a screen 426 and audio device 428 located in a second room 420, and a device 436 with integrated screen and speakers in a third room 430. The AP may be, for example, a cable modem, set-top box, router, or the like.

As illustrated, devices connected with the AP may stream to various other devices. For example, the player 412 may stream to the screen 416 and a speakers 414, the DVR may stream to screen 426 and audio device 428. Certain devices may be both sources and receivers of streams.

As illustrated in FIG. 4, data may be sent from multiple sources to multiple destinations in parallel on the same channel, during distributed MIMO transmit opportunities (TX-OPs). In the following disclosure, distributed MIMO TXOPs may also be referred to as MIMO TXOPs, or simply as TXOPs.

According to certain embodiments of the present disclosure, the start of a MIMO TXOP may be indicated by a start frame, which may be transmitted by the AP or another device in the network (that assumes a master role for the purpose of scheduling transmissions in the MIMO TXOP).

The start frame may specify various parameters of MIMO transmissions between devices during the pending TXOP. For example, the start frame may specify the transmitters and receivers during the pending TXOP, the spatial streams they may use, the maximum TXOP duration, and possibly the timing of response frames, such as block acknowledgements (BAs). The start frame may also synchronize the start of the transmission amongst the multiple transmitters.

As will be described below with reference to particular examples, during the TXOP, each transmitter may transmit data using beamforming to its intended receiver, while attempting to minimize the power received by the other receivers. As an alternative, a transmitter may send data on a predetermined set of spatial streams, which may be filtered by the intended receiver.

The number of transmit (Tx) and receive (Rx) antennas may be different in each of these cases, as will be described in greater detail below. In addition, the channel conditions between a transmitter and each of the destinations may be known at the transmitters, for example, either implicitly by receiving a suitable transmission from each of the receivers or explicitly by receiving a channel matrix or similar from each of the receivers.

In the following description, reference may be made to an AP as initiating a TXOP with a start frame. However, it should be understood that the master role of scheduling MIMO transmissions in a TXOP may reside at either an AP and/or at any station that is capable of scheduling. Further, a network may contain multiple such master devices.

Figure 5:
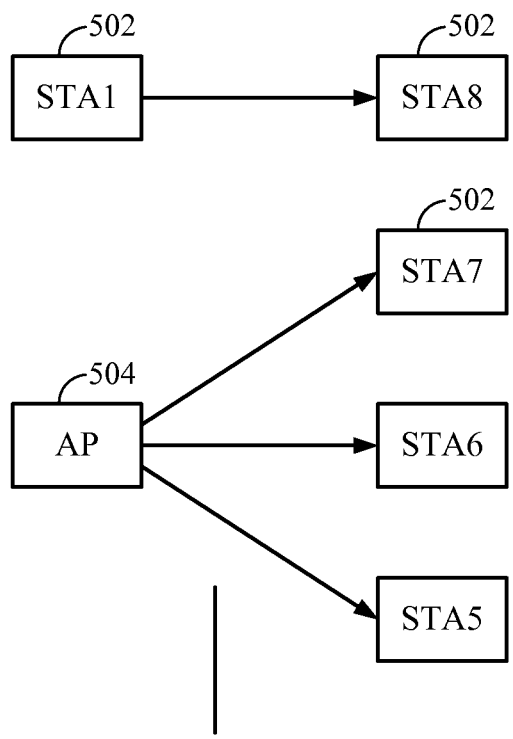
FIG. 5 illustrates an example (MIMO) system, in accordance with certain embodiments of the present disclosure.

FIG. 5 illustrates an example MIMO system, in which an AP 504 transmits parallel MIMO streams to three stations 502 (STA5-STA7) and one station (STA1) transmit parallel MIMO streams to another station (STA8). The illustrated AP and stations may correspond, for example, to the components illustrated in the system of FIG. 4.

According to certain embodiments, the stations allowed to participate in parallel MIMO transmissions during a TXOP may be selected and their transmission parameters may be controlled, for example, by an AP or non-AP station serving as a master device.

For example, to prevent near-far problems at the receivers during a distributed TXOP, the secondary signals should not be stronger than the primary signal by some threshold. As used herein, the term "primary signal" generally refers to the signal from the source transmitter, while the term "secondary signal" generally refers to signals from the other transmitters during the distributed TXOP. A measure of signal strength may be referred to herein as Received Signal Strength Indicator (RSSI).

The master device may take the signal strength requirement into account when scheduling transmitters and receivers for a distributed TXOP. For this purpose, the master device may periodically request a Received Signal Strength Indication (RSSI)-list from all receiving devices. The RSSI-list may contain the RSSI at the receiver for the devices listed in the RSSI-list request. If the receiving device has multiple receive antennas, it may report the maximum RSSI across all receive antennas, or the average RSSI over all antennas, where the averaging may be done on linear power values (e.g., rather than on logarithmic values).

Prior to sending the RSSI-list request, the master device may request the transmitters to transmit a frame, allowing the receivers to measure RSSI under current channel conditions and assemble the RSSI-list. According to certain embodiments, obtaining the RSSI-list may be combined with obtaining the channel matrices (i.e. it may be combined with sounding).

Thus, in addition to specifying which devices may participate in MIMO transmissions during a TXOP, a start frame may also specify a TX power requirement for each transmitter. In this manner, a master device may avoid a near-far problem by reducing the Tx power for some transmitters in the distributed TXOP.

Figure 6:
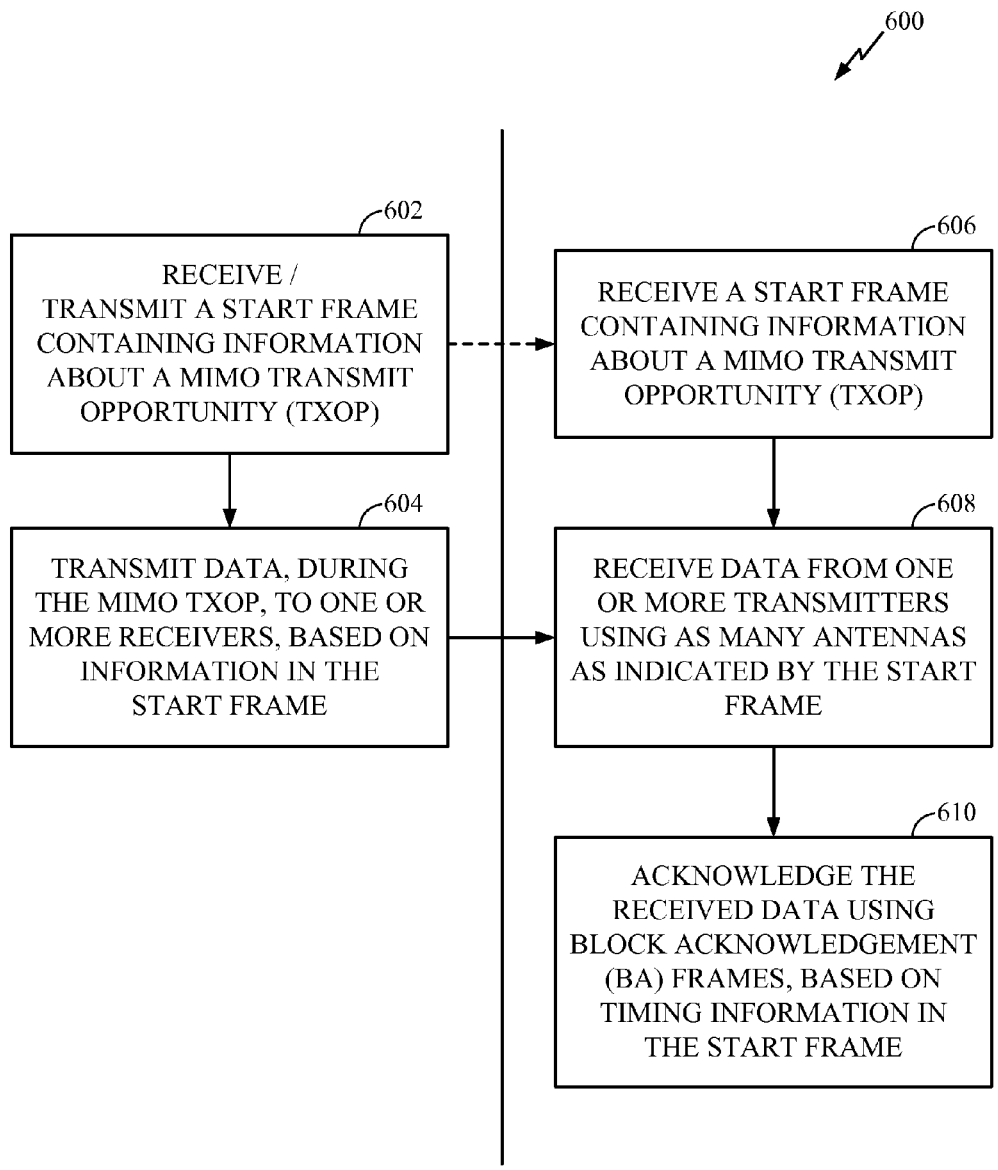
FIG. 6 illustrates example operations for parallel MIMO transmissions, in accordance with certain embodiments of the present disclosure.

FIG. 6 illustrates example operations 600 that may be performed by receiver and transmitter devices in a distributed MIMO system, in accordance with certain aspects of the present disclosure. The operations 602 and 604 may be performed by a transmitting device, while the operations 606-610 may be performed by a receiving device.

At 602, a start frame containing information about a MIMO transmit opportunity (TXOP) is received (or transmitted if the device is acting as a master device). At 604, data may be transmitted in one or more parallel MIMO stream(s) during the TXOP, with the data transmitted according to the information contained in the start frame.

At 606, the (same) start frame is received by a receiving device and, at 608, data is received from one or more transmitters, with the data received according to the information contained in the start frame. Optionally, at 610, the received data may be acknowledged, for example, with block acknowledgement (BA) frames transmitted in accordance with timing information from the start frame.

Figure 7:
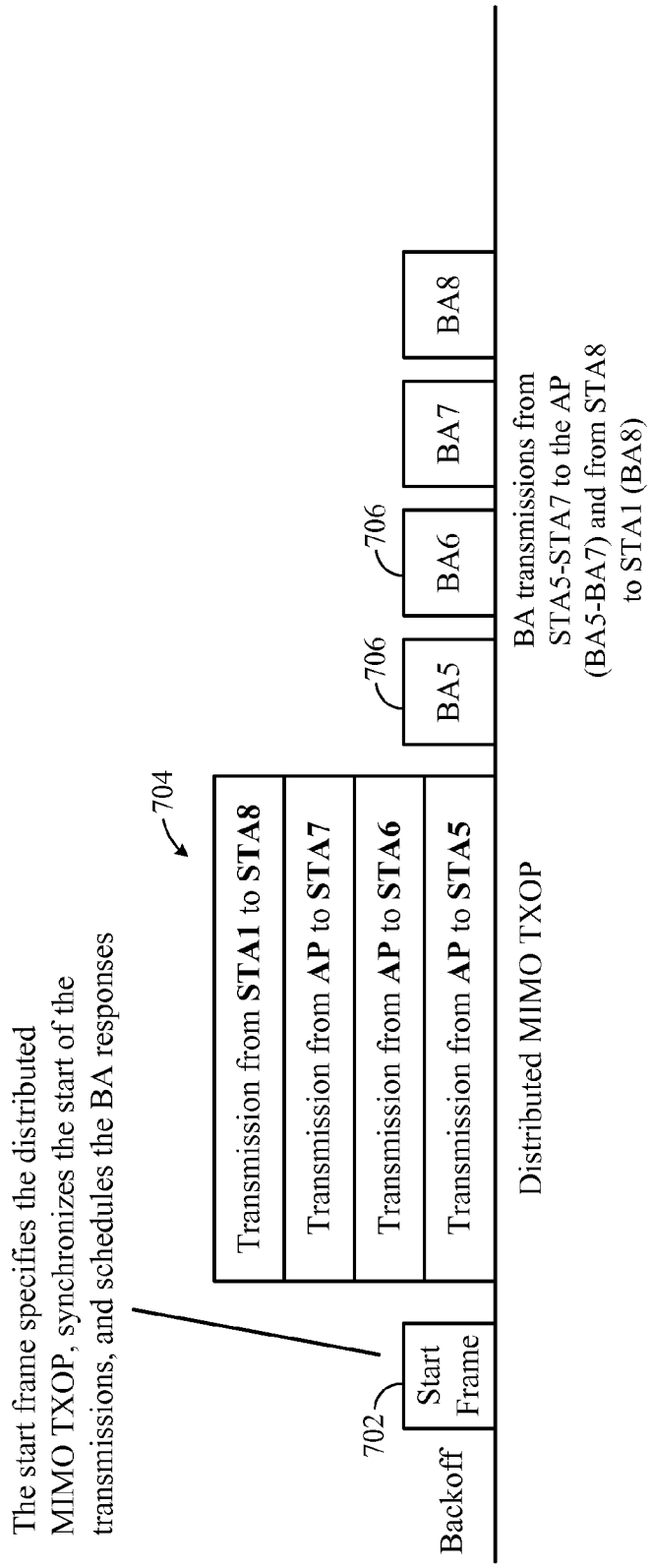
FIG. 7 illustrates an example exchange of MIMO transmissions, in accordance with certain embodiments of the present disclosure.

FIG. 7 illustrates an example exchange of MIMO transmissions, in accordance with the operations of FIG. 6. As illustrated, a master device may transmit a start frame 702 containing information about transmissions in a distributed TXOP. During the TXOP, transmitting devices may send parallel MIMO transmissions 704 to receiving devices. The receiving devices may acknowledge data received in the TXOP with BA frames 706. As illustrated, the start frame 702 may specify the distributed MIMO TXOP, may also synchronize the start of the transmissions 704, and may also specify the timing of the BA frames 706.

As noted above, according to certain embodiments, during the TXOP, each transmitter may utilize beamforming when transmitting to its intended receiver, while attempting to minimizing the power received by the other receivers. In such embodiments, each of the transmitters active during the MIMO TXOP may utilize at least as many TX antennas as the total number of spatial streams (SSs) that are used during the distributed MIMO TXOP.

Figure 8:
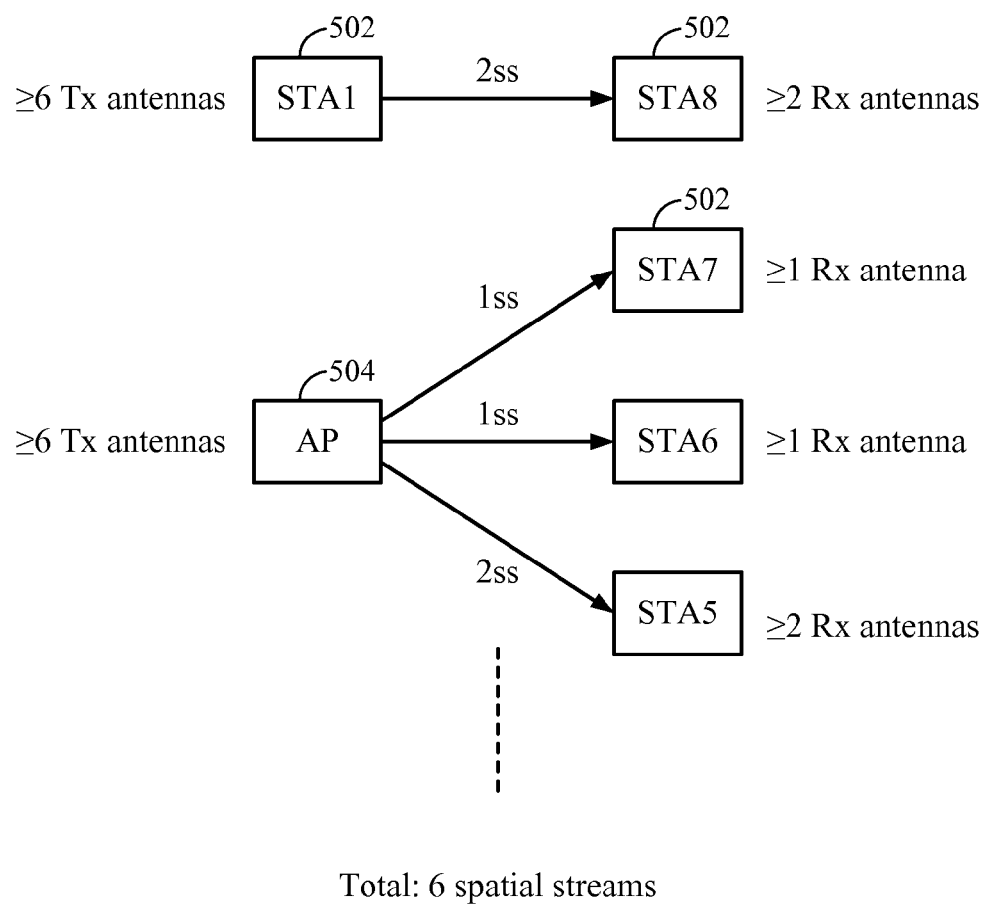
FIG. 8 illustrates an example (MIMO) system, in accordance with certain embodiments of the present disclosure.

Each receiver may utilize as many Rx antennas as spatial streams used to transmit to that station, as illustrated in FIG. 8. In the illustrated example, STA1 transmits on two spatial streams to STA8, thus STA8 may receive with two Rx antennas. AP may transmit to STA6 and STA7 using 1 stream, and to STA5 using two streams. Thus, STA6 and STA7 may utilize one Rx antenna, while STA5 may utilize two Rx antennas.

The channel state information between the transmitters and each of the receivers may be determined through sounding. Sounding may be based on implicit or explicit feedback. For implicit feedback, each receiver periodically transmits a frame which contains enough Long Training Fields (LTFs) to sound the channel. The receivers may do so autonomously or coordinated by the AP.

For explicit feedback, each transmitter may periodically transmit a sounding frame, to which each receiver may respond with a broadcast frame which contains a channel matrix between the transmitter and the station. The transmitters may transmit sounding frames 912 autonomously as illustrated in FIG. 9. As illustrated, the source (AP or STA1) may transmit a sounding frame 910, while each receiving station may reply with its own channel matrix (e.g., in a sequential order scheduled in the sounding frame 910).

As an alternative, transmitting devices (e.g., AP and/or STA1 in this example) may coordinate sounding, in which case the channel matrices may be combined into a single frame 1012 as illustrated in FIG. 10, in response to sounding frames 1010. As illustrated, each frame 1012 may include the channel matrices between the AP (determined based on the sounding frame 1010A), as well as channel matrices between the STA1 and responding station (determined based on the sounding frame 1010S sent by STA1). The sounding frame 1010S sent by STA1 and the reply frames 1012 may be sent in a sequential order scheduled in the sounding frame 1010A sent by the AP.

According to certain aspects, feedback provided via sounding frames may comprise channel matrices. As an alternative, or in addition, the feedback may also comprise (compressed) beamforming matrices (e.g., when the sounding approach described below with reference to FIG. 11 is used).

FIGS. 11-13 illustrate other example sounding exchanges, in which channel matrices may be transmitted (individually between stations or broadcast) in various frames in accordance with certain embodiments of the present disclosure. In addition to channel matrices, the RSSI for each of the transmitters may be included in the response frame(s).

As illustrated in FIG. 11, following a Sounding Start frame 1102, multiple sources (STA1-STA4) may each transmit a sounding frame 1110. Each receiver (STA5-STA8) may reply with their channel matrices sent in a reply frame in a sequential order scheduled in the start sounding frame 1102.

As illustrated in FIG. 12, following a Sounding Start frame 1202, multiple sources (STA1-STA4) may each transmit a sounding frame 1210. A single receiver (e.g., STA6 in this example) may reply with a frame 1212 containing the channel matrix for each source individually, in a sequential order scheduled in the start sounding frame 1202.

As an alternative, illustrated in FIG. 13, following a Sounding Start frame 1302, the multiple sources (STA1-STA4) may each transmit a sounding frame 1310, and the single receiver (e.g., STA6 in this example) may reply with a single broadcast frame 1312 containing the channel matrices for all of the sources.

During the TXOP, the transmitters may transmit on spatial streams that are known to the receiver beforehand, for instance through the start frame or through prior configuration, after which each receiver filters only the spatial streams it is required to receive. According to such embodiments, each transmitter uses at least as many Tx antennas as the number of spatial streams it is transmitting on, and each receiver may use at least as many Rx antennas as the total number of spatial streams used during the MIMO TXOP.

Figure 14:
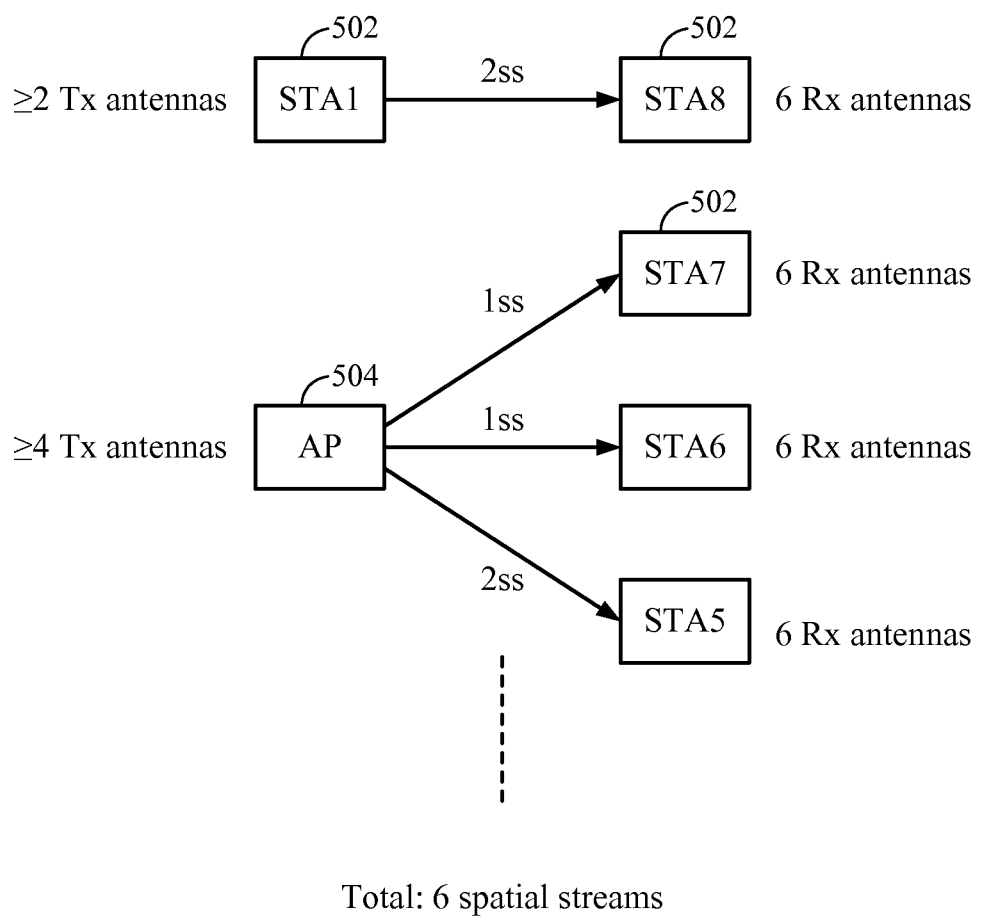
FIG. 14 illustrates an example (MIMO) system, in accordance with certain embodiments of the present disclosure.

Such an embodiment is illustrated in FIG. 14. In the illustrated example, STA1 transmits on two spatial streams to STA8, while the AP transmits to STA6 and STA7 using 1 stream, and to STA5 using two streams, resulting in a total of six streams. Thus, the receiving stations (STA5-STA8) may all receive using six Rx antennas.

As noted above, the start frame may synchronize the start of the transmission amongst the transmitters. Ranging may be required in order to make the timing precise enough. A separate sounding sequence may not be required, because the transmissions may start with enough LTFs for the stations to determine how to filter the appropriate spatial streams.

Figure 15:
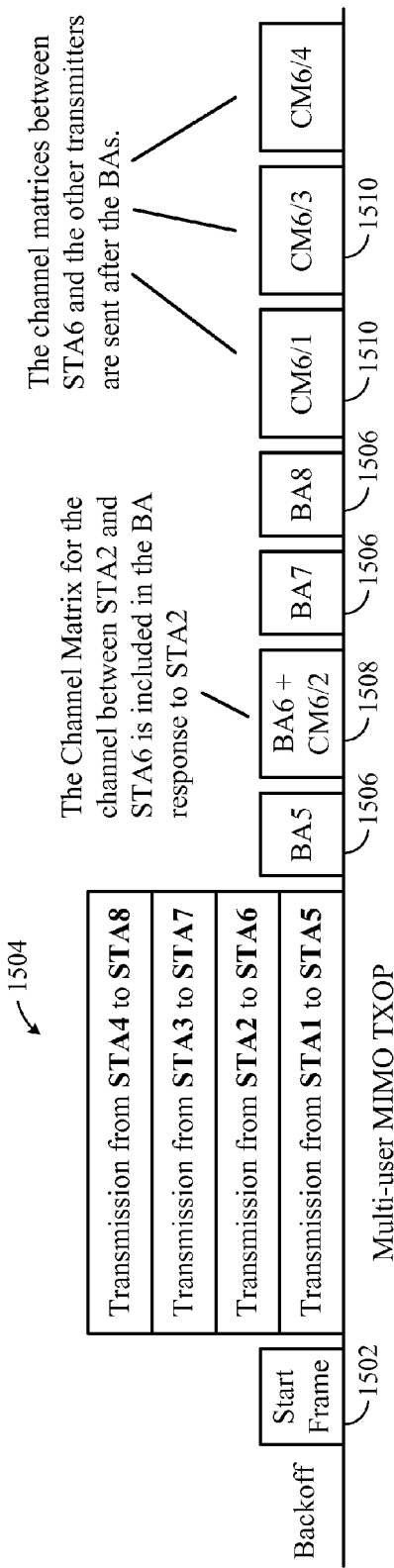
FIGS. 15-16 illustrate example techniques for obtaining channel matrices without explicit sounding, in accordance with certain embodiments of the present disclosure.
Figure 16:
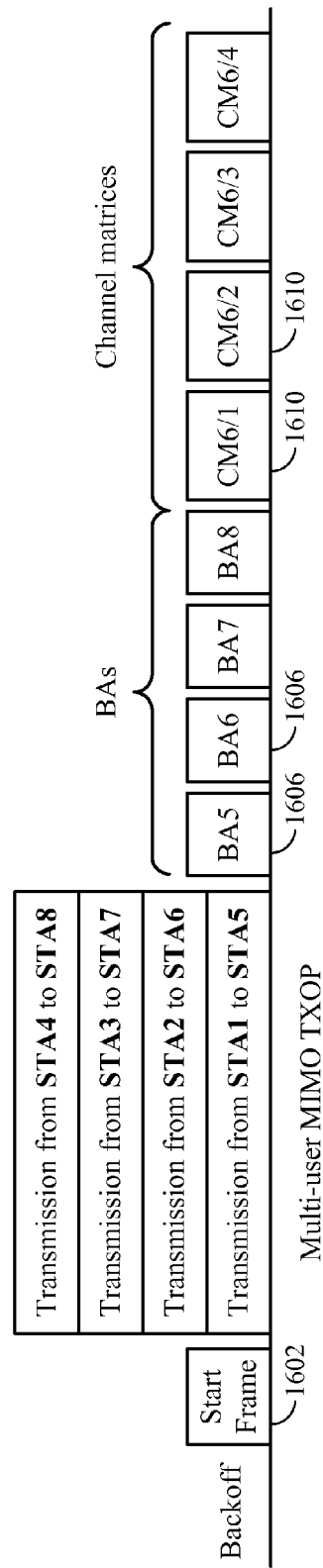

Thus, FIGS. 15 and 16 illustrate example embodiments, where channel matrices are sent in frames without separate sounding frames. As illustrated in FIG. 15, following a start frame 1502 and multi-user MIMO transmissions 1504, stations may respond with Block Acknowledgements 1506-1510. As illustrated, some Channel Matrix information may be included in a Block Acknowledgement (BA) frame (as shown with BA1508), while other Channel Matrix Information may be provided in separate frames 1510 (e.g., after the BAs).

In some cases, BAs may not contain Channel Matrix Information. For example, as illustrated in FIG. 16, following a start frame 1602 and multi-user MIMO transmissions 1604, stations may respond with separate Block Acknowledgements 1606, followed by separate reply frames 1610 containing Channel Matrix information.

According to certain embodiments, prior to being able to participate in distributed MIMO TXOPs, non-AP transmitters set up a direct link with their receivers. The non-AP transmitter (i.e., STA1) may inform the AP of this fact, after which the AP may include STA1 in distributed MIMO TXOPs. Similarly, a non-AP transmitter may include the AP in distributed MIMO TXOPs when the non-AP transmitter gains a TXOP and not all available spatial streams are used. The AP and the non-AP transmitter may also still use TXOPs for themselves, without including other transmitters. However, when a TXOP is gained which uses less spatial streams than the smallest number of transmitters in some subset of stations, then including other transmitters will improve the overall efficiency.

According to certain embodiments, for a non-AP transmitter to include the AP in distributed MIMO TXOPs, the non-AP transmitter may need to be made aware of the active destinations for the AP. Similarly, an AP may need to be made aware of active destination(s) for the non-AP transmitter in order for the AP to include the non-AP transmitter. According to certain embodiments, this information may be conveyed through TSPECs or through new to be defined Action frames, or simply by announcing the direct link to the AP.

Figure 6A:
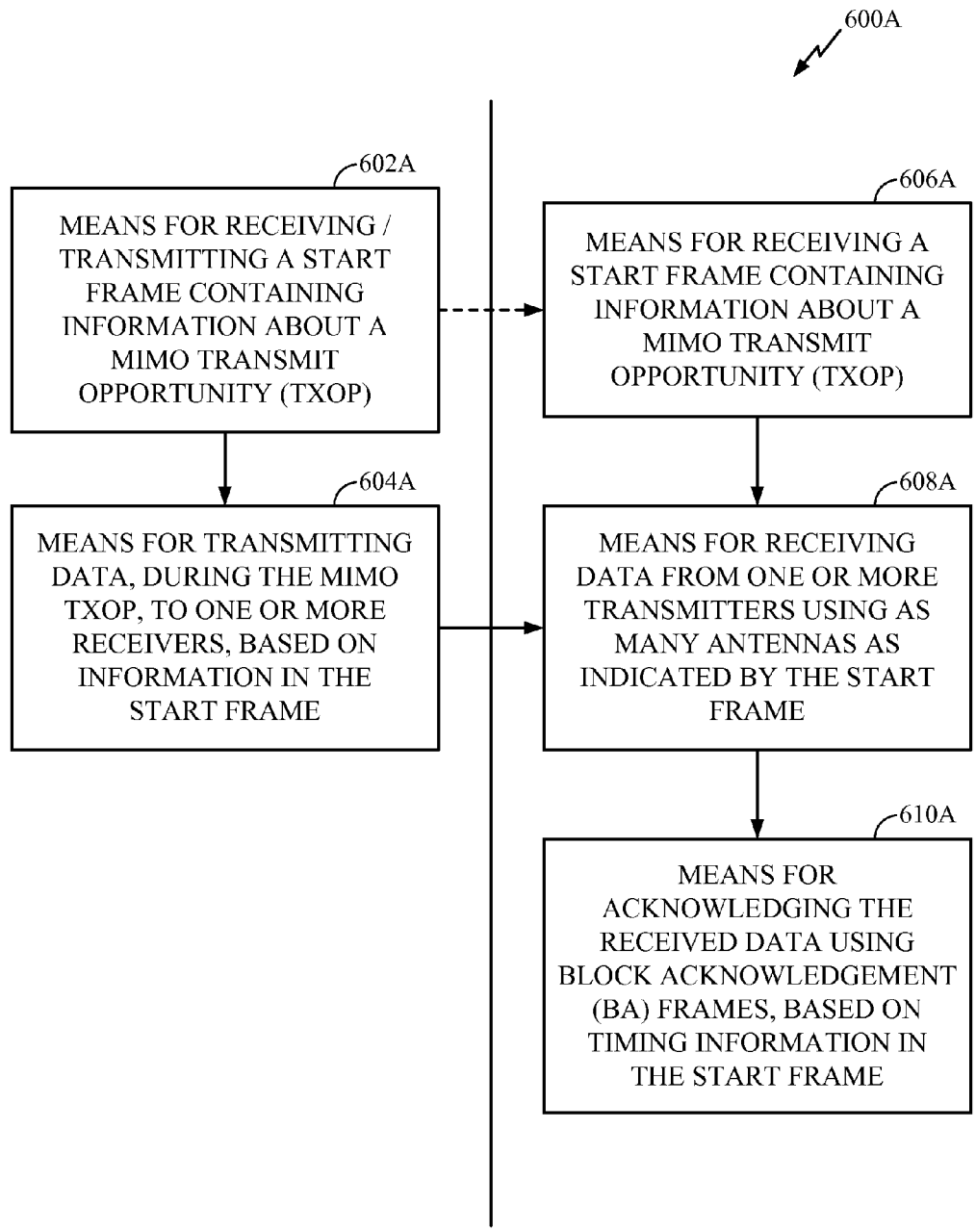
FIG. 6A illustrates example components capable of performing the operations illustrated in FIG. 6.

The various operations of the method described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 602-610 illustrated in FIG. 6 corresponds to means-plus-function blocks 602A-610A illustrated in FIG. 6A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
transmitting, from an apparatus, a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and
transmitting one or more MIMO streams in accordance with the information contained in the start frame.

2. The method of claim 1, wherein the information comprises at least one of: a number of spatial streams for each of the MIMO transmissions, a number of transmit antennas for each of the MIMO transmissions, or a number of receive antennas for each of the MIMO transmissions.

3. The method of claim 1, wherein the information comprises an identification of one or more devices to transmit the MIMO transmissions and one or more devices to receive the MIMO transmissions.

4. The method of claim 1, wherein the MIMO transmissions comprise sounding frames.

5. The method of claim 1, wherein the information comprises a number of transmit antennas for each of the MIMO transmissions.

6. The method of claim 1, wherein the parallel MIMO transmissions comprise distributed MIMO transmissions.

7. A method for wireless communications, comprising:
receiving, at an apparatus, a start frame including information, wherein the information comprises a starting time to synchronize a start of parallel multiple-input multiple-output (MIMO) transmissions among multiple apparatuses, wherein the information specifies a transmission power requirement for each transmitter among the multiple apparatuses, and wherein the transmission power requirement for each transmitter includes a reduction of transmission power for at least one transmitter; and
transmitting, from the apparatus, one or more MIMO streams in accordance with the information contained in the start frame.

8. The method of claim 7, wherein the information comprises at least one of: a number of spatial streams for each of the MIMO transmissions, a number of transmit antennas for each of the MIMO transmissions, or a number of receive antennas for each of the MIMO transmissions.

9. The method of claim 7, wherein the information comprises an identification of one or more devices to transmit the MIMO transmissions and one or more devices to receive the MIMO transmissions.

10. The method of claim 7, wherein the start frame indicates the starting time to synchronize the start of the MIMO transmissions among the multiple apparatuses.

11. The method of claim 10, wherein the MIMO transmissions comprise sounding frames.

12. The method of claim 11, further comprising receiving at least one of channel matrices or beamforming matrices generated based on the sounding frames.

13. A method for wireless communications, comprising:
receiving, at an apparatus, a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and
receiving one or more MIMO streams in accordance with the information contained in the start frame.

14. The method of claim 13, wherein the information comprises at least one of: a number of spatial streams for each of the MIMO transmissions, a number of transmit antennas for each of the MIMO transmissions, or a number of receive antennas for each of the MIMO transmissions.

15. The method of claim 14, wherein receiving the one or more MIMO streams in accordance with the information contained in the start frame comprises receiving a MIMO stream utilizing a number of antennas corresponding to a total number of spatial streams identified in the information.

16. The method of claim 13, wherein the MIMO transmissions comprise sounding frames.

17. The method of claim 16, further comprising transmitting at least one of channel matrices or beamforming matrices generated based on the sounding frames.

18. The method of claim 13, wherein the information comprises a number of receive antennas for each of the MIMO transmissions.

19. The method of claim 13, wherein the parallel MIMO transmissions comprise distributed MIMO transmissions.

20. An apparatus for wireless communications, comprising:
logic configured to transmit a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and
logic configured to transmit one or more MIMO streams in accordance with the information contained in the start frame.

21. The apparatus of claim 20, wherein the information comprises at least one of: a number of spatial streams for each of the MIMO transmissions, a number of transmit antennas for each of the MIMO transmissions, or a number of receive antennas for each of the MIMO transmissions.

22. The apparatus of claim 20, wherein the information comprises an identification of one or more devices to transmit the MIMO transmissions and one or more devices to receive the MIMO transmissions.

23. The apparatus of claim 20, wherein the MIMO transmissions comprise sounding frames.

24. The apparatus of claim 20, wherein the information comprises a number of receive antennas for each of the MIMO transmissions.

25. The apparatus of claim 20, further comprising at least one of a user device, a wireless device, a mobile station, or a base station, of which the logic configured to transmit the start frame is a constituent part.

26. An apparatus for wireless communications, comprising:
logic configured to receive a start frame including information, wherein the information comprises a starting time to synchronize a start of parallel multiple-input multiple-output (MIMO) transmissions among multiple apparatuses, wherein the information specifies a transmission power requirement for each transmitter among the multiple apparatuses, and wherein the transmission power requirement for each transmitter includes a reduction of transmission power for at least one transmitter; and logic configured to transmit one or more MIMO streams in accordance with the information contained in the start frame.

27. The apparatus of claim 26, wherein the information comprises at least one of: a number of spatial streams for each of the MIMO transmissions, a number of transmit antennas for each of the MIMO transmissions, or a number of receive antennas for each of the MIMO transmissions.

28. The apparatus of claim 26, wherein the information comprises an identification of one or more devices to transmit the MIMO transmissions and one or more devices to receive the MIMO transmissions.

29. The apparatus of claim 26, wherein the start frame indicates the starting time to synchronize the start of the MIMO transmissions among the multiple apparatuses.

30. The apparatus of claim 29, wherein the MIMO transmissions comprise sounding frames.

31. The apparatus of claim 30, further comprising logic configured to receive at least one of channel matrices or beamforming matrices generated based on the sounding frames.

32. The apparatus of claim 26, further comprising at least one of a user device, a wireless device, a mobile station, or a base station, of which the logic configured to receive the start frame is a constituent part.

33. An apparatus for wireless communications, comprising:

logic configured to receive a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and logic configured to receive one or more MIMO streams in accordance with the information contained in the start frame.

34. The apparatus of claim 33, wherein the information comprises at least one of: a number of spatial streams for each of the MIMO transmissions, a number of transmit antennas for each of the MIMO transmissions, or a number of receive antennas for each of the MIMO transmissions.

35. The apparatus of claim 34, wherein the logic configured to receive the one or more MIMO streams in accordance with the information contained in the start frame comprises logic configured to receive a MIMO stream utilizing a number of antennas corresponding to a total number of spatial streams identified in the information.

36. The apparatus of claim 33, wherein the MIMO transmissions comprise sounding frames.

37. The apparatus of claim 36, further comprising logic configured to transmit at least one of channel matrices or beamforming matrices generated based on the sounding frames.

38. The apparatus of claim 33, wherein the information comprises a number of transmit antennas for each of the MIMO transmissions.

39. The apparatus of claim 33, further comprising at least one of a user device, a wireless device, a mobile station, or a base station, of which the logic configured to receive the start frame is a constituent part.

40. An apparatus for wireless communications, comprising:

means for transmitting a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and means for transmitting one or more MIMO streams in accordance with the information contained in the start frame.

41. An apparatus for wireless communications, comprising:

means for receiving a start frame including information, wherein the information comprises a starting time to synchronize a start of parallel multiple-input multiple-output (MIMO) transmissions among multiple apparatuses, wherein the information specifies a transmission power requirement for each transmitter among the multiple apparatuses, and wherein the transmission power requirement for each transmitter includes a reduction of transmission power for at least one transmitter; and means for transmitting one or more MIMO streams in accordance with the information contained in the start frame.

42. An apparatus for wireless communications, comprising:

means for receiving a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and means for receiving one or more MIMO streams in accordance with the information contained in the start frame.

43. A non-transitory computer-program product for wireless communications comprising a computer readable medium having a set of instructions stored thereon, the set of instructions being executable by one or more processors and the set of instructions comprising:

instructions to transmit a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and instructions to transmit one or more MIMO streams in accordance with the information contained in the start frame.

44. A non-transitory computer-program product for wireless communications comprising a computer readable medium having a set of instructions stored thereon, the set of instructions being executable by one or more processors and the set of instructions comprising:

instructions to receive, at an apparatus, a start frame including information, wherein the information comprises a starting time to synchronize a start of parallel multiple-input multiple-output (MIMO) transmissions among multiple apparatuses, wherein the information specifies a transmission power requirement for each transmitter among the multiple apparatuses, and wherein the transmission power requirement for each transmitter includes a reduction of transmission power for at least one transmitter; and instructions to transmit, from the apparatus, one or more MIMO streams in accordance with the information contained in the start frame.

45. A non-transitory computer-program product for wireless communications comprising a computer readable medium having a set of instructions stored thereon, the set of instructions being executable by one or more processors and the set of instructions comprising:

instructions to receive a start frame including information regarding parallel multiple-input multiple-output (MIMO) transmissions in a transmit opportunity, wherein the information indicates a starting time to synchronize the start of the MIMO transmissions among multiple apparatuses, wherein the information specifies a transmission power requirement for each transmitter among the multiple apparatuses, and wherein the transmission power requirement for each transmitter includes a reduction of transmission power for at least one transmitter; and instructions to receive one or more MIMO streams in accordance with the information contained in the start frame.

* * * * *